United States Patent
Katoh et al.

[11] Patent Number: 5,848,529
[45] Date of Patent: Dec. 15, 1998

[54] APPARATUS AND METHOD FOR PURIFYING EXHAUST GAS IN AN INTERNAL COMBUSTION ENGINE

[75] Inventors: Kenji Katoh, Sunto-gun; Masato Gotoh; Takamitsu Asanuma, both of Susono, all of Japan

[73] Assignee: Toyota Jidosha Kabushiki Kaisha, Aichi, Japan

[21] Appl. No.: 933,618

[22] Filed: Sep. 8, 1997

[30]   Foreign Application Priority Data

Sep. 9, 1996  [JP]  Japan .................................... 8-237946

[51] Int. Cl.⁶ ........................................................ F01N 3/00
[52] U.S. Cl. .......................................... 060/274; 060/285
[58] Field of Search .............................. 60/274, 276, 285, 60/301

[56]          References Cited

U.S. PATENT DOCUMENTS

| | | | |
|---|---|---|---|
| 5,386,694 | 2/1995 | Ogawa et al. | 60/285 X |
| 5,437,153 | 8/1995 | Takeshima et al. | |
| 5,450,722 | 9/1995 | Takeshima et al. | |
| 5,473,887 | 12/1995 | Takeshima et al. | |
| 5,483,195 | 1/1996 | Kato et al. | |
| 5,657,627 | 8/1997 | Akazaki et al. | 60/285 X |
| 5,732,554 | 3/1998 | Sasaki et al. | 60/285 X |
| 5,740,669 | 4/1998 | Kinugasa et al. | |

FOREIGN PATENT DOCUMENTS

| | | |
|---|---|---|
| WO 9307363 | 4/1993 | European Pat. Off. . |
| 59-77025 | 5/1984 | Japan ........................................ 60/285 |
| 5-33715A | 2/1993 | Japan . |

*Primary Examiner*—John E. Ryznic
*Attorney, Agent, or Firm*—Kenyon & Kenyon

[57]          ABSTRACT

An apparatus for, and a method of, purifying exhaust gas emitted from an internal combustion engine reduces fuel consumption under a lean operating condition and generates high torque under a rich operating condition without deteriorating the cleanness of exhaust gas and the driveability of the engine. The apparatus and method improve the durability of a variable valve timing mechanism of the engine.

The engine operation involves lean and rich operating conditions. The variable valve timing mechanism of the apparatus changes the open and close timing of at least one of intake and exhaust valves of the engine. The apparatus further has a catalytic converter in an exhaust system, to occlude NOx under the lean operating condition and discharge and reduce the occluded NOx under the rich operating condition. The apparatus also has a prohibition unit for prohibiting the variable valve timing mechanism from changing the valve open and close timing of the valves when the air-fuel ratio of the engine is changed from lean to rich to discharge and reduce the occluded NOx.

2 Claims, 7 Drawing Sheets

| INTAKE AIR QUANTITY GN [g/rev.] \ ENGINE REVOLUTION SPEED NE [rpm] | 800 | 1600 | 2400 | 3200 | ∼ | 6400 |
|---|---|---|---|---|---|---|
| 0.25 | 0 | 5 | 10 | 15 | ∼ | 15 |
| 0.50 | 10 | 20 | 25 | 30 | ∼ | 20 |
| 0.75 | 25 | 35 | 40 | 40 | ∼ | 30 |
| 1.00 | 40 | 50 | 60 | 60 | ∼ | 30 |
| 1.25 | 40 | 50 | 60 | 60 | ∼ | 20 |
| 1.50 | 30 | 40 | 50 | 45 | ∼ | 10 |
| 1.75 | 30 | 35 | 40 | 30 | ∼ | 0 |
| 2.00 | 30 | 35 | 40 | 30 | ∼ | 0 |

Fig.8

APPARATUS AND METHOD FOR PURIFYING EXHAUST GAS IN AN INTERNAL COMBUSTION ENGINE

BACKGROUND OF THE INVENTION

1. Field of the Invention

The present invention relates to an apparatus for, and a method of, purifying exhaust gas emitted from an internal combustion engine and, particularly, from an internal combustion engine that has a variable valve timing mechanism and an NOx occlusion-reduction catalyst.

2. Description of the Related Art

A variable valve timing mechanism changes the open and close timing of at least one of intake and exhaust valves of an engine. This mechanism may change the open and close timing of the intake valve so that the intake valve opens before the exhaust valve closes, to produce a valve overlap period in which the intake and exhaust valves are both open. During the valve overlap period, the intake valve introduces air and fuel into a combustion chamber of the engine, and at the same time, the exhaust valve guides recirculated exhaust gas into the combustion chamber. The recirculated exhaust gas contains inert gas to decrease a combustion temperature. This is an EGR (exhaust gas recirculation) effect that reduces NOx, which is actively produced when the temperature of the combustion chamber is high.

The open and close timing of the valves is usually controlled based on engine operating conditions and an air-fuel ratio. If the engine is idling, the valve overlap period is made smaller or negative to reduce the amount of recirculated exhaust gas, thereby stabilizing the idling operation, slowing an idling speed, and decreasing fuel consumption. If the engine is running under partial load, i.e., light or medium load, the valve overlap period is extended to increase the amount of recirculated exhaust gas, to decrease combustion temperature, NOx, pumping loss, and fuel consumption. If the engine is running under full load, the close timing of the intake valve is varied to improve a volumetric efficiency and increase the output of the engine.

A lean burn system is effective to reduce fuel consumption and $CO_2$. When load on the engine is light or medium, the lean burn system provides a lean air-fuel ratio for the engine, to reduce pumping loss, cooling loss, and fuel consumption. The fuel consumption reducing effect of the lean burn system is great and is about twice as large as the EGR effect. The lean burn system, however, requires the valve overlap period to be short. If the valve overlap period is long during the operation of the lean burn system, an increase in recirculated exhaust gas may destabilize combustion and cause a misfire. In addition, the lean air-fuel ratio set by the lean burn system deteriorates the NOx purifying function of a conventional three-way catalyst. To solve this problem, the applicant of the present invention has disclosed in WO93/07363 an exhaust purifier capable of reducing NOx even under a lean air-fuel ratio. This purifier employs an NOx occlusion-reduction catalyst that occludes NOx while the engine is operating at a lean air-fuel ratio. Before the occluded NOx reaches a given level, the disclosure momentarily achieves a rich air-fuel ratio to reduce and purify the occluded NOx. The lean burn system provides a stoichiometric air-fuel ratio if the load on the engine is heavy and requires a high engine output. In this case, the valve overlap period is elongated to reduce NOx and fuel consumption. At this time, the catalyst provides a three-way catalytic function to efficiently purify NOx, CO, and HC.

If this exhaust purifier having the NOx occlusion-reduction catalyst is combined with the variable valve timing mechanism, the variable valve timing mechanism will change the open and close timing of the valves whenever the air-fuel ratio is momentarily controlled to rich to reduce NOx. Since this rich state lasts for a short time, for example, 0.3 seconds, the variable valve timing mechanism is unable to drive the intake (or exhaust) valve in such a short time, thereby deteriorating the quality of exhaust gas, the driveability of the engine, and the durability of the variable valve timing mechanism.

SUMMARY OF THE INVENTION

An object of the present invention is to provide an apparatus for, and a method of, purifying exhaust gas emitted from an internal combustion engine, capable of solving the problems mentioned above, reducing fuel consumption through a lean operation, producing high torque through a rich operation, maintaining the cleanness of exhaust gas and the driveability of the engine, and improving the durability of a variable valve timing mechanism.

In order to accomplish the object, the present invention provides an apparatus for purifying exhaust gas emitted from an internal combustion engine that involves a lean operating condition and a rich operating condition. The apparatus has an air-fuel ratio detector for detecting an air-fuel ratio in exhaust gas emitted from the engine, a variable valve timing mechanism for changing the open and close timing of at least one of the intake and the exhaust valves of the engine according to the detected air-fuel ratio, an NOx occlusion-reduction catalyst arranged in an exhaust system of the engine, for occluding NOx under the lean operating condition and discharging and reducing the occluded NOx under the rich operating condition, a rich spike controller for executing rich spike control to control the air-fuel ratio of the engine from lean to rich, to discharge and reduce the occluded NOx, and a prohibition unit for prohibiting the variable valve timing mechanism from changing the open and close timing of the valves while the rich spike controller is executing the rich spike control.

The present invention also provides a method of purifying exhaust gas emitted from an internal combustion engine that involves a lean operating condition and a rich operating condition. The method includes the steps of changing the open and close timing of at least one of intake and exhaust valves of the engine according to an air-fuel ratio of the engine, carrying out rich spike control to momentarily make the air-fuel ratio of the engine rich to reduce an oxygen concentration in exhaust gas so that an NOx occlusion and reduction three-way catalyst arranged in an exhaust system of the engine may discharge and reduce NOx before the NOx having been occluded by the catalytic means under the lean operating condition reaches the NOx occluding capacity of the catalyst, and prohibiting any change in the open and close timing of the valves while the rich spike control is being carried out.

In this way, the apparatus and method of the present invention carry out the rich spike control to momentarily make the air-fuel ratio of the engine rich to drop an oxygen concentration in exhaust gas, thereby discharging and reducing NOx occluded in the catalyst under the lean operating condition before the occluded NOx reaches the NOx occluding capacity of the catalyst. Whenever the rich spike control is executed, the apparatus and method of the present invention prohibit any change in the open and close timing of the valves because the variable valve timing mechanism is unable to follow the speed of the momentary rich spike operation. Consequently, the present invention is capable of maintaining the cleanness of exhaust gas and the driveability of the engine and improving the durability of the variable valve timing mechanism.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

The preferred embodiments of the present invention will be described below with reference to the accompanying drawings.

Figure 1:
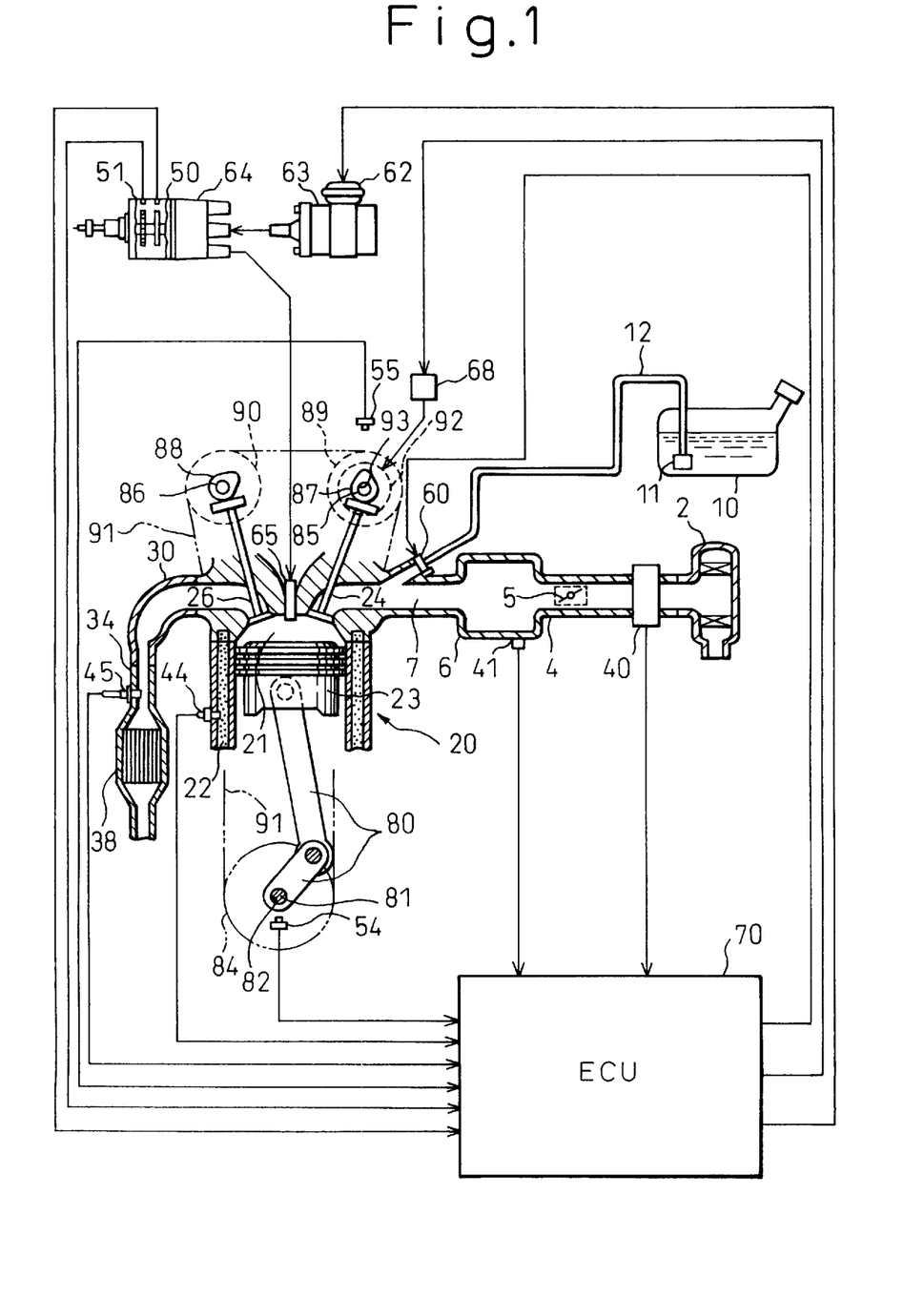
FIG. 1 shows an internal combustion engine provided with an exhaust gas purifying apparatus and a variable valve timing mechanism according to an embodiment of the present invention.

FIG. 1 shows an internal combustion engine provided with an exhaust gas purifying apparatus and a variable valve timing mechanism according to an embodiment of the present invention. An air cleaner 2 filters air that is used for combustion in each cylinder 20 of the engine. The air is passed through a throttle body 4 and a surge tank (intake manifold) 6, which distributes the air to an intake duct 7 of each cylinder 20. The throttle body 4 has a throttle valve 5 to adjust the quantity of intake air. An air flow meter 40 measures the mass flow rate of intake air. A vacuum sensor 41 detects a pressure in the intake duct 7.

A fuel tank 10 stores fuel. The fuel is pumped up by a fuel pump 11, is passed through a fuel pipe 12, and is injected by a fuel injection valve 60 into the intake duct 7.

The intake duct 7 mixes the fuel with intake air, and the mixture is drawn into a combustion chamber of the cylinder 20 through an intake valve 24. The mixture in the combustion chamber 21 is compressed by a piston 23 and is ignited to explode and burn to produce torque. More precisely, an igniter 62 controls, in response to an ignition signal, a primary current flowing to an ignition coil 63. The ignition coil 63 provides a secondary current to an ignition distributor 64, which fires a spark plug 65.

The ignition distributor 64 has a reference crank angle sensor 50 and a crank angle sensor 51. The reference crank angle sensor 50 generates a reference position pulse at intervals of, for example, 720 degrees in crank angle. The crank angle sensor 51 generates a position pulse at intervals of, for example, 30 degrees in crank angle. An actual vehicle speed is detected by a vehicle speed sensor (not shown) that generates pulses representing the vehicle speed. The cylinder 20 has a cooling water path 22 for passing cooling water to cool the cylinder 20. The temperature of the cooling water is detected by a water temperature sensor 44.

The burned air-fuel mixture produces exhaust gas, which is passed through an exhaust valve 26 into an exhaust manifold 30 and an exhaust duct 34. The exhaust duct 34 has an $O_2$ sensor 45 for detecting an oxygen concentration in the exhaust gas. A catalytic converter 38 is arranged in the exhaust system downstream from the $O_2$ sensor 45. The catalytic converter 38 consists of an NOx occlusion-reduction catalyst that is made of three-way catalytic components and NOx occlusion agent. The three-way catalytic components simultaneously promote, in the exhaust gas, the oxidization of unburned components (HC, CO) and the reduction of nitrogen oxides (NOx). The catalyst occludes NOx emitted from the engine while the engine is running at a lean air-fuel ratio and discharges and reduces the occluded NOx when the engine is momentarily run at a rich air-fuel ratio, to thereby maintain the NOx occluding capacity of the catalyst. In this way, the catalytic converter 38 purifies exhaust gas and discharges the purified gas into atmosphere.

Mechanisms for opening and closing the intake valve 24 and exhaust valve 26 will be explained. The piston 23 is connected to a crankshaft 81 through a connecting rod 80. An end of the crankshaft 81 has a timing pulley 84. The intake valve 24 is driven by a cam 87 attached to a cam shaft 85. The exhaust valve 26 is driven by a cam 88 attached to a cam shaft 86. An end of the cam shaft 85 has a timing pulley 89, and an end of the cam shaft 86 has a timing pulley 90. The timing pulleys 89 and 90 are connected to the timing pulley 84 through a timing belt 91. The crankshaft 81 drives the cam shafts 85 and 86, which open and close the intake valve 24 and exhaust valve 26 at given crank angles. The crank shaft 81 has an embedded magnetic element 82, which cooperates with a first magnetic sensor 54 arranged in the vicinity of the crank shaft 81 to generate reference pulses. The cam shaft 85 has an embedded magnetic element 93, which cooperates with a second magnetic sensor 55 arranged in the vicinity of the cam shaft 85 to generate reference pulses.

The variable valve timing mechanism 92 is a known one and is arranged between the cam shaft 85 and the timing pulley 89, to rotate them relative to each other. The mechanism 92 has an intermediate gear having helical teeth between the cam shaft 85 and the timing pulley 89 each having external teeth. The intermediate gear is axially movable and connects the cam shaft 85 and timing pulley 89 to each other, to rotate them relative to each other. The axial movement of the intermediate gear is realized by controlling hydraulic pressure with a hydraulic pressure control valve 68.

Figure 2:
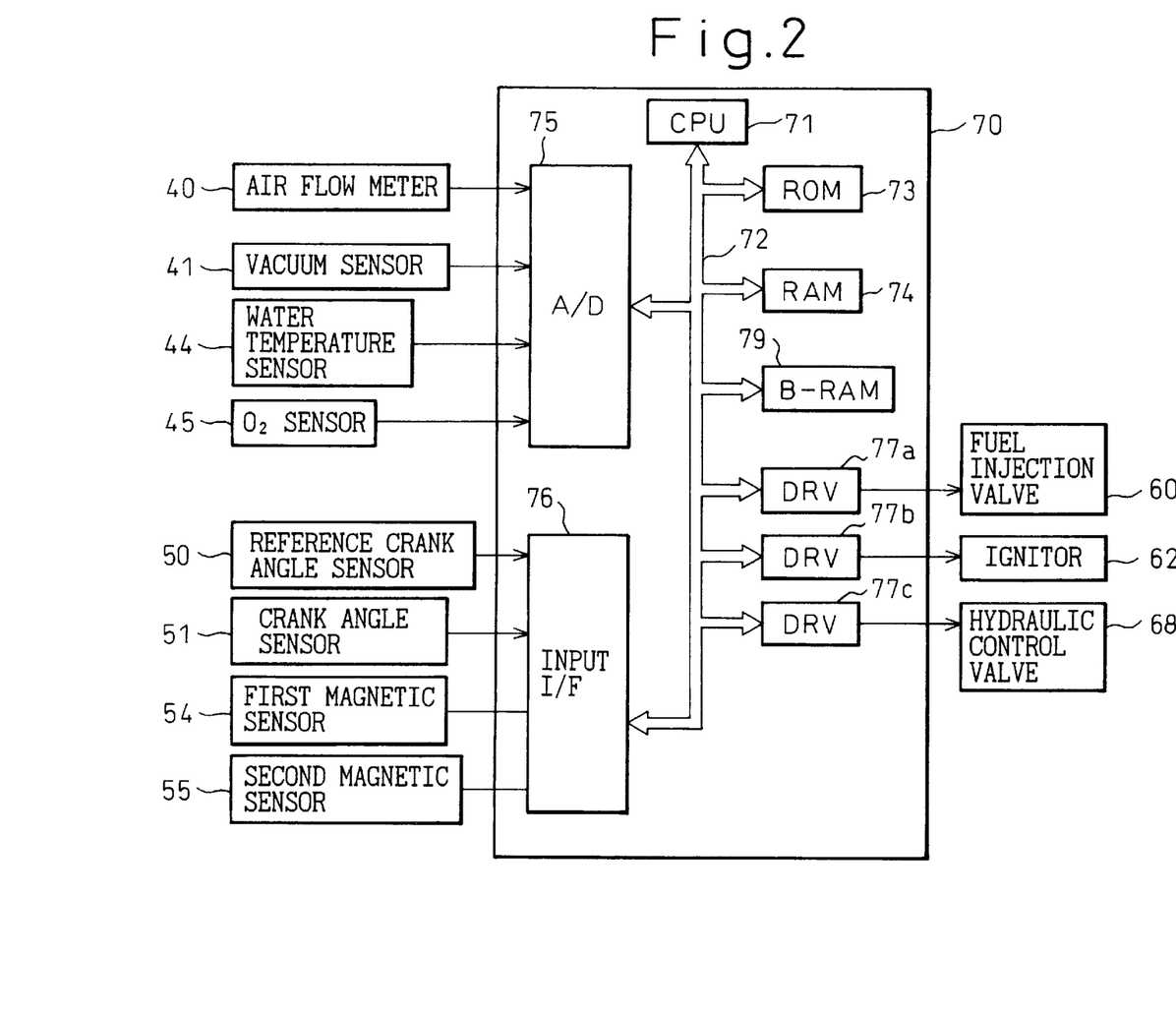
FIG. 2 shows an electronic engine control unit according to the embodiment.

FIG. 2 shows the structure of an electronic engine control unit (ECU) 70 according to the embodiment of the present invention. The ECU 70 is a microcomputer system to carry out fuel injection control, ignition timing control, and valve timing control according to the present invention. A read-only memory (ROM) 73 stores programs and maps used by a central processing unit (CPU) 71. The CPU 71 receives signals from sensors and switches through an A/D converter 75 and an input interface 76, processes the signals, and provides control signals through drive controllers 77a to 77c. A random access memory (RAM) 74 temporarily stores data during the operation of the CPU 71. A backup RAM 79 directly receives power from a battery (not shown), to store data such as learned values even if an ignition switch is OFF. These elements of the ECU 70 are connected to one another through a system bus 72 composed of an address bus, a data bus, and a control bus.

The fuel injection control achieved by the ECU 70 will be explained.

Figure 3:
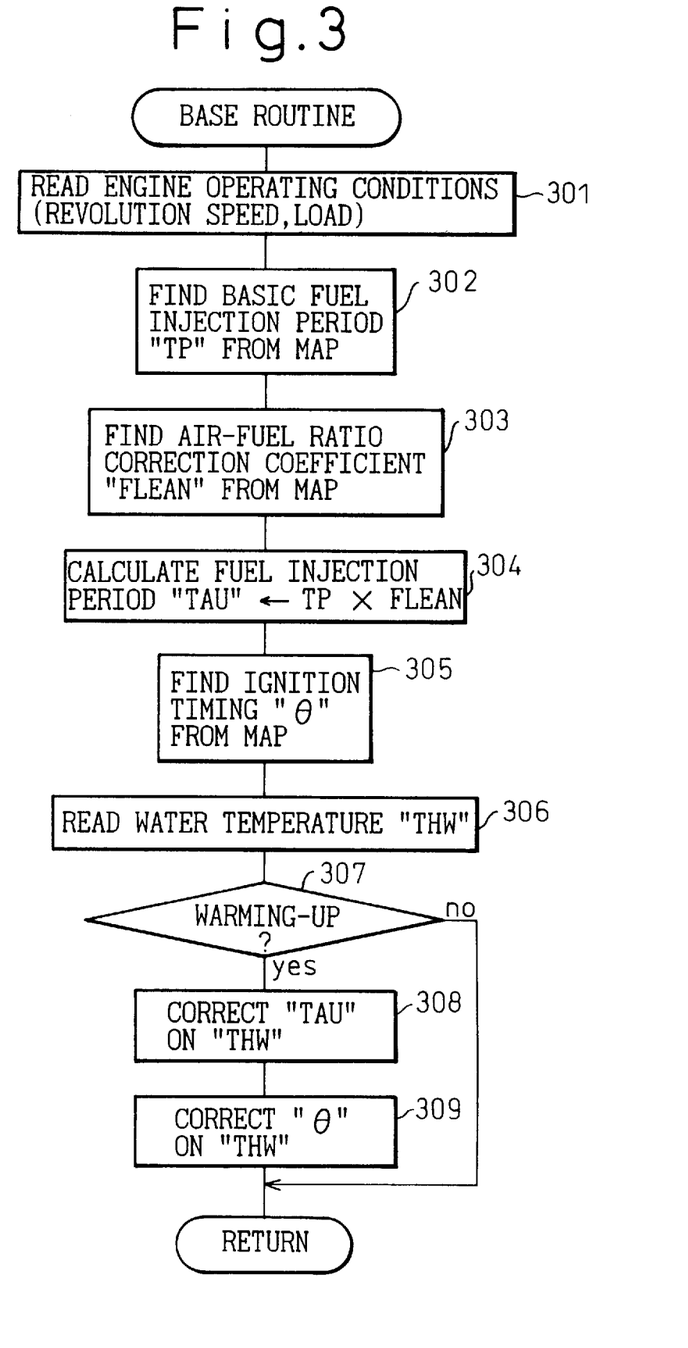
FIG. 3 is a flowchart showing a routine of calculating a fuel injection period and ignition timing according to the embodiment.

FIG. 3 is a flowchart showing a routine of calculating a fuel injection period and ignition timing according to the fuel injection control of the present invention. This routine is executed at 1 ms intervals in a main routine. Step 301 detects engine operating conditions. Namely, step 301 reads an engine revolution speed NE based on the output of the crank angle sensor 51 and an intake duct pressure PM, i.e., a load detected by the vacuum sensor 41. Step 302 refers to a two-dimensional map (not shown) stored in the ROM 73 according to the values NE and PM and calculates a basic fuel injection period TP corresponding to the engine operating conditions. Step 303 refers to a two-dimensional map (not shown) according to the values NE and PM and calculates a lean air-fuel ratio correction coefficient FLEAN corresponding to the engine operating conditions. If the engine is running at a low or medium speed under light load, the coefficient FLEAN is set to be in the range of, for example, 0.6 to 0.8 to realize a lean air-fuel ratio. If the engine is running at a high speed under medium or heavy load, the coefficient FLEAN is set to 1.0 to achieve a rich air-fuel ratio, e.g., a stoichiometric air-fuel ratio. Step 304 calculates a fuel injection period TAU as follows:

$$TAU=TP \times FLEAN$$

Step 305 refers to a map (not shown) stored in the ROM 73 according to the revolution speed and load as well as an air-fuel ratio detected by the $O_2$ sensor 45 and calculates ignition timing θ. The ignition timing θ is advanced as the air-fuel ratio becomes leaner from a stoichiometric air-fuel ratio of 14.5. This is because combustion in the engine becomes slower as the air-fuel ratio becomes leaner.

Step 306 reads a water temperature THW from the water temperature sensor 44. Step 307 compares the water temperature THW with a reference temperature of, for example, 80 degrees and determines whether or not the engine is cold, i.e., whether or not the engine is warming up. If THW<80, the engine is warming up, and step 308 is carried out. If THW≧80, the warming-up is complete, and the routine ends. Step 308 refers to a map (not shown) stored in the ROM 73 according to the water temperature THW and calculates a warm-up correction coefficient FWL. The fuel injection period TAU calculated in step 304 is multiplied by the coefficient FWL, to provide a corrected TAU (TAU←TAU×FWL). Step 309 refers to a map (not shown) stored in the ROM 73 according to the water temperature THW and calculates an ignition timing correction angle, which is set to advance the ignition timing as the water temperature becomes lower. This correction angle is added to the ignition timing θ calculated in step 305, to provide a corrected ignition timing θ.

In this way, if step 307 determines that the engine is warming up, the fuel injection control of this embodiment activates the drive controller 77a to open the fuel injection valve 60 for the fuel injection period TAU calculated in step 308 at the fuel injection timing of each cylinder calculated according to the outputs of the reference crank angle sensor 50 and crank angle sensor 51. In combination with this control, the ignition timing control of this embodiment detects the ignition timing θ calculated in step 309 on the output of the crank angle sensor 51, and at this timing, activates the drive controller 77b to send an ignition signal to the igniter 62. Then, a primary current flows through the ignition coil 63, which provides a secondary current to the spark plug 65 to ignite a mixture of fuel and air in the combustion chamber. The embodiment interpolates the output of the crank angle sensor 51, which is provided at intervals of 30 degrees in crank angle, so that the ignition timing may be set at an accuracy of one degree in crank angle.

The air-fuel ratio control and rich spike control according to the present invention will be explained.

Figure 4:
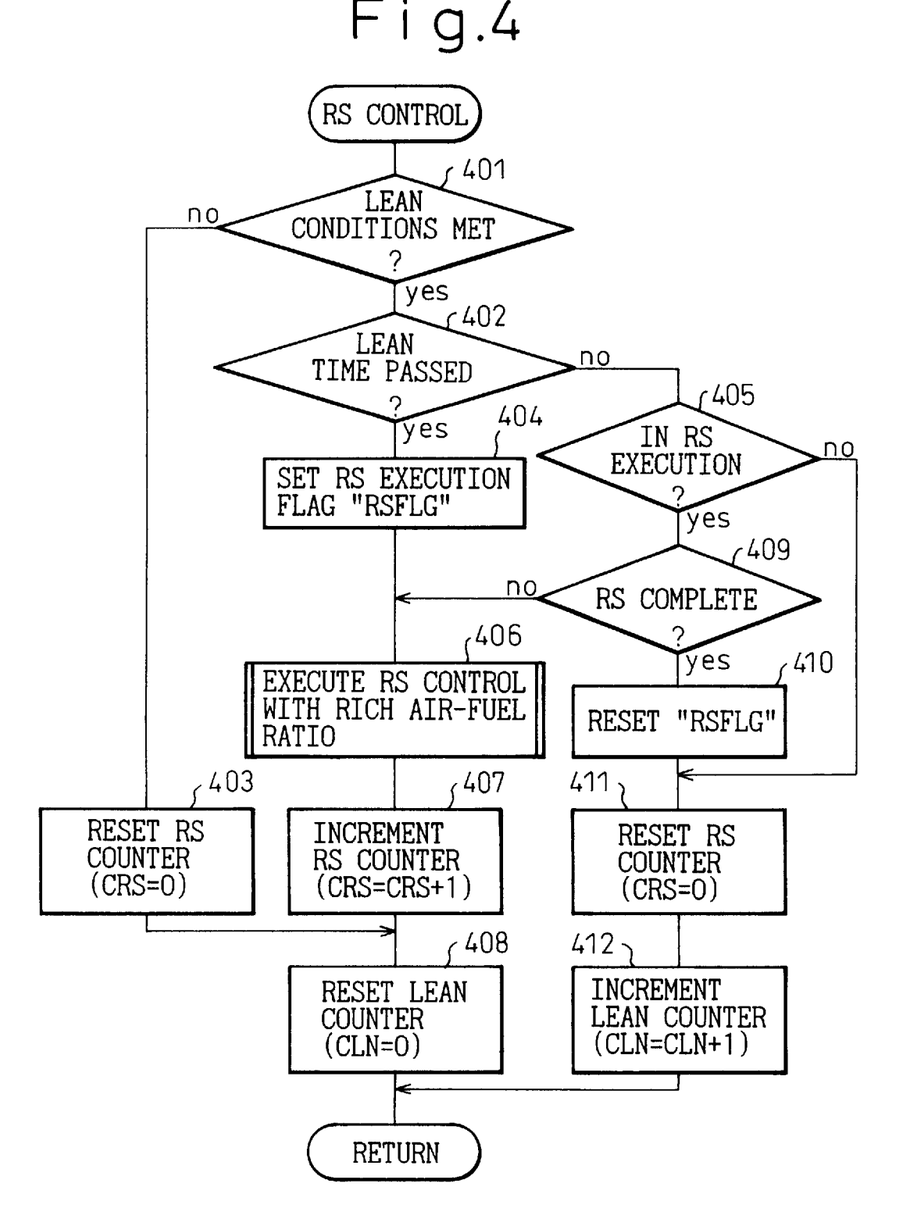
FIG. 4 is a flowchart showing a routine of carrying out rich spike control according to the embodiment.

FIG. 4 is a flowchart showing a routine of carrying out the rich spike control. This routine is carried out at 4 ms intervals. Step 401 determines whether or not a lean condition is met, i.e., whether or not the engine must be operated at a lean air-fuel ratio. If the lean condition is met, step 402 is carried out, and if not, step 403 is carried out. The determination of step 401 is made based on the coefficient FLEAN because, as explained in step 303 of FIG. 3, the coefficient FLEAN is set to 0.6 to 0.8 if the engine is running at a light or medium speed under light load, and to 1.0 to achieve a stoichiometric air-fuel ratio if the engine is running at a high speed under medium or heavy load.

Step 402 compares a lean time counter CLN with a reference time a, which is, for example, 30 seconds. If CLN>a, 30 seconds have passed and step 404 is carried out. If CLN≦a, step 405 is carried out. The reference time a is determined depending on the NOx occluding capacity of the catalyst contained in the catalytic converter 38. Since the lean time counter CLN is incremented by one at 4-msec intervals, the reference time a is set to 7500 corresponding to 30 seconds. Step 404 sets a rich spike execution flag RSFLG to 1 to indicate that the rich spike control must be carried out. Step 406 carries out the rich spike control to make the air-fuel ratio of the engine rich. For example, step 406 sets the coefficient FLEAN to 1.45 (14.5/10) to realize a target rich air-fuel ratio of, for example, 10. When the air-fuel ratio is made rich, an oxygen concentration in the exhaust gas decreases to discharge and reduce NOx occluded in the catalyst.

Step 407 adds 1 to a rich spike time counter CRS. Step 408 resets the lean time counter CLN to 0. Namely, the lean time counter CLN is reset at 4-msec intervals while the rich spike control is being executed. If step 401 determines that the lean condition is not met, step 403 resets the rich spike time counter CRS to 0.

If step 402 determines that the lean time counter CLN is below 30 seconds, step 405 checks the rich spike execution flag RSFLG to see if the rich spike control is in execution. If RSFLG=1 to indicate that the rich spike control is being executed, step 409 is carried out, and if RSFLG=0, step 411 is carried out. Step 409 determines whether or not the rich spike control is complete. Namely, step 409 compares the rich spike time counter CRS with a reference time b, which is, for example, 0.3 seconds. If CRS>b, 0.3 seconds have passed to complete the rich spike control, and step 410 is carried out. If CRS≦b, the rich spike control is incomplete, and step 406 is carried out. The reference time b is set so that the catalyst (the catalytic converter 38) may discharge and reduce occluded NOx and restore the NOx occluding capacity thereof. Since the rich spike counter CRS is incremented by one at 4-msec intervals, the reference time b is set to 75 corresponding to 0.3 seconds.

Step 410 resets the rich spike execution flag RSFLG. Step 411 resets the rich spike time counter CRS to 0. Step 412 adds 1 to the lean time counter CLN. In this way, the rich spike control of this embodiment drives the engine at a lean air-fuel ratio for 30 seconds set by the lean time counter CLN. During this period, the catalyst occludes NOx. Thereafter, the embodiment drives the engine at a rich air-fuel ratio of, for example, 10 for 0.3 seconds set by the rich spike time counter CRS. During this period, the catalyst discharges and reduces the occluded NOx. The embodiment repeats these processes.

The variable valve timing control of the present invention will be explained. First, variable valve timing will be explained.

Figure 5:
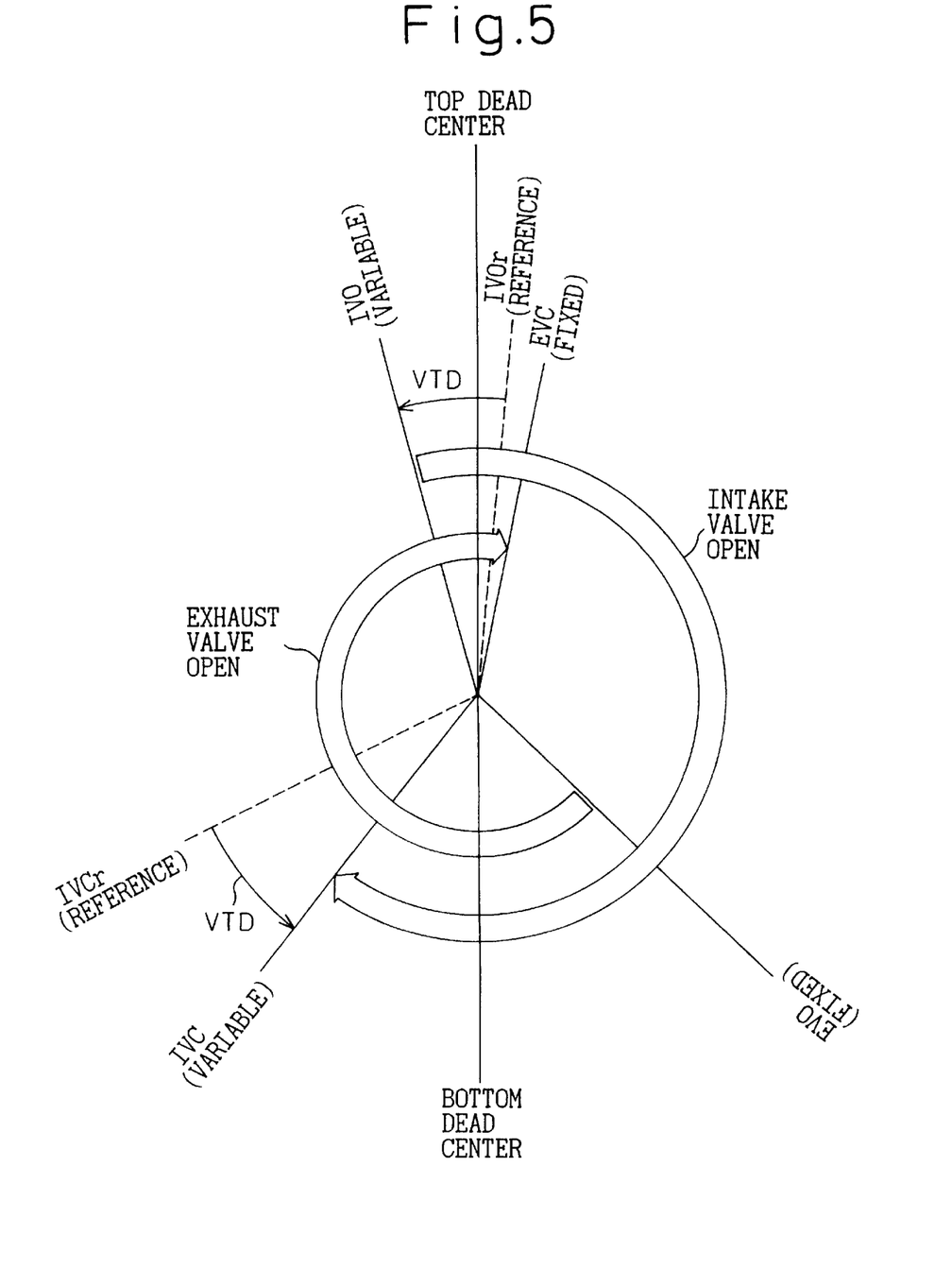
FIG. 5 shows the open and close timing of intake and exhaust valves and corresponding crank angles.

FIG. 5 shows the open and close timing of the intake and exhaust valves 24 and 26 and corresponding crank angles. The exhaust valve 26 is opened at fixed open timing EVO, which is 50 degrees before an exhaust bottom dead center according to the embodiment, and is closed at fixed close timing EVC, which is 3 degrees after an exhaust top dead center according to the embodiment. The intake valve 24 has a fixed valve open period and variable open timing IVO and close timing IVC. The most retarded open timing IVOr and close timing IVCr of the intake valve 24 serve as reference positions. Starting from these reference positions, the open and close timing IVO and IVC of the intake valve 24 are optionally advanced subject to the maximum of a valve timing displacement VTD being 60 degrees. The displacement VTD from the reference positions serves as a control target.

In this embodiment, the reference close timing IVOr is three degrees after the exhaust top dead center, and the reference close timing IVCr is 65 degrees after an intake bottom dead center. If the valve timing displacement VTD is 30 degrees in crank angle, the intake valve open timing IVO is 27 degrees before the exhaust top dead center, and the intake valve close timing is 35 degrees after the intake bottom dead center. In this embodiment, the reference open timing IVOr of the intake valve 24 is equal to the fixed close timing EVC of the exhaust valve 26 and is three degrees after the exhaust top dead center. Accordingly, the displacement VTD agrees with a valve overlap period.

The variable valve timing control basically sets target open and close timing for the intake valve 24 according to engine operating conditions and an air-fuel ratio detected in exhaust gas and controls the variable valve timing mechanism 92 accordingly. More precisely, the variable valve timing control makes the cam shaft 85 of the intake valve 24 achieve a required rotational phase with respect to the crankshaft 81 by feedback-controlling the hydraulic pressure control valve 68 in response to signals from the first and second magnetic sensors 54 and 55. If the open and close timing of the intake valve 24 is changed in response to an air-fuel ratio detected in exhaust gas whenever the rich spike control of FIG. 4 is carried out, the cleanness of the exhaust gas and the driveability of the engine will deteriorate. This is because the rich spike control is executed only for a short time, for example, 0.3 seconds, which is too short for the mechanism 92 to follow and because the rich spike control is frequently executed at intervals of 30 seconds. This means that, if the engine is driven at an average vehicle speed of 40 km/h for 100,000 km, the open and close timing of the intake valve 24 is changed 600,000 times to cause a problem in the durability of the mechanism 92. To solve this problem, the present invention prohibits any change in the open and close timing of the intake valve 24 if the rich spike control is being carried out.

Figure 6:
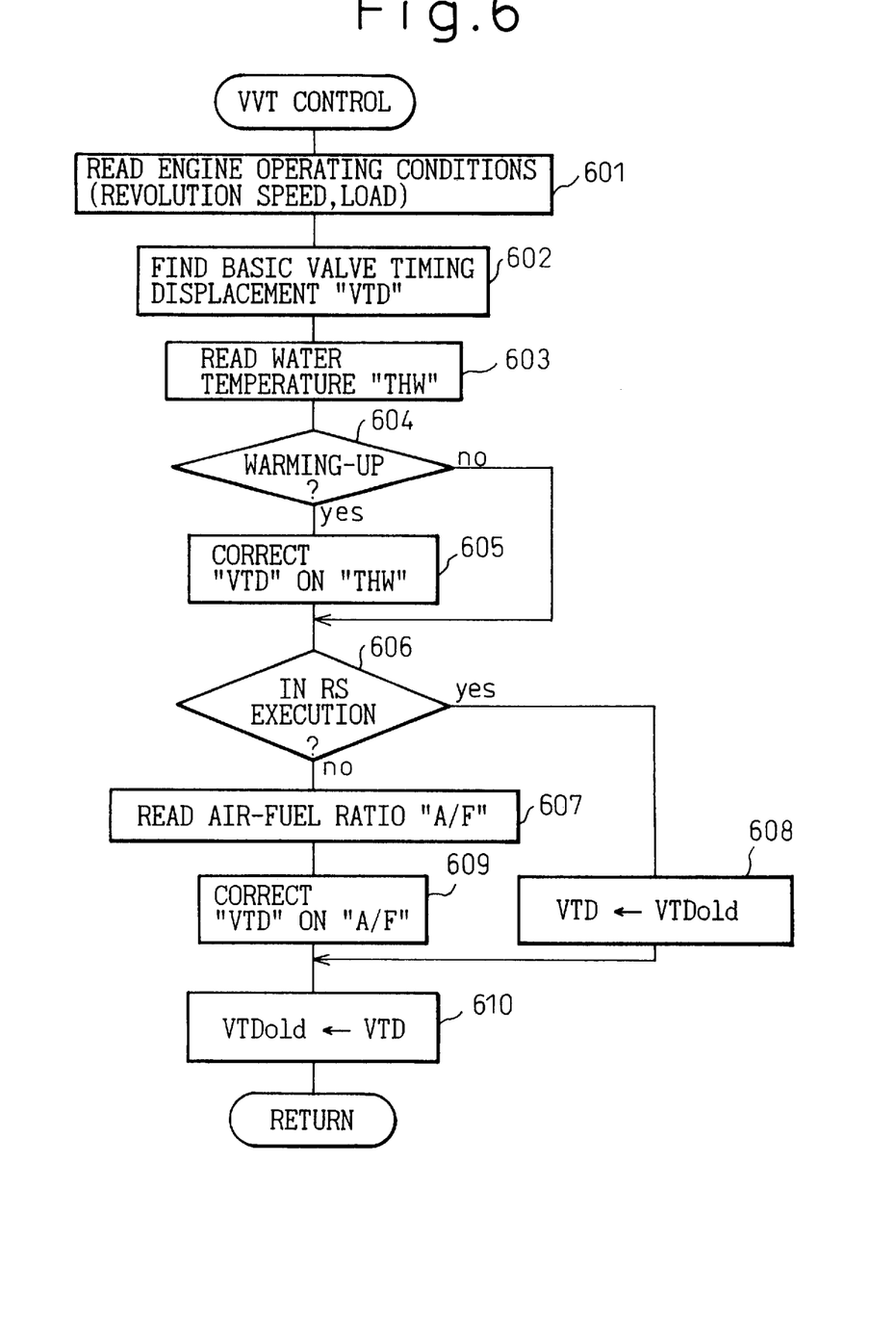
FIG. 6 is a flowchart showing a routine of controlling a variable valve timing mechanism according to the embodiment.

FIG. 6 is a flowchart showing a routine of carrying out the variable valve timing control according to the present invention. This routine is carried out at 4 ms intervals. Step 601 detects engine operating conditions by reading an engine revolution speed NE based on the output of the crank angle sensor 51 as well as an intake air quantity GA from the air flow meter 40. The value GA is divided by the value NE, to provide a load GN. Step 602 refers to a two-dimensional map of FIG. 7 stored in the ROM 73 according to the revolution speed NE and load GN and calculates a target valve timing displacement VTD.

Figure 8:
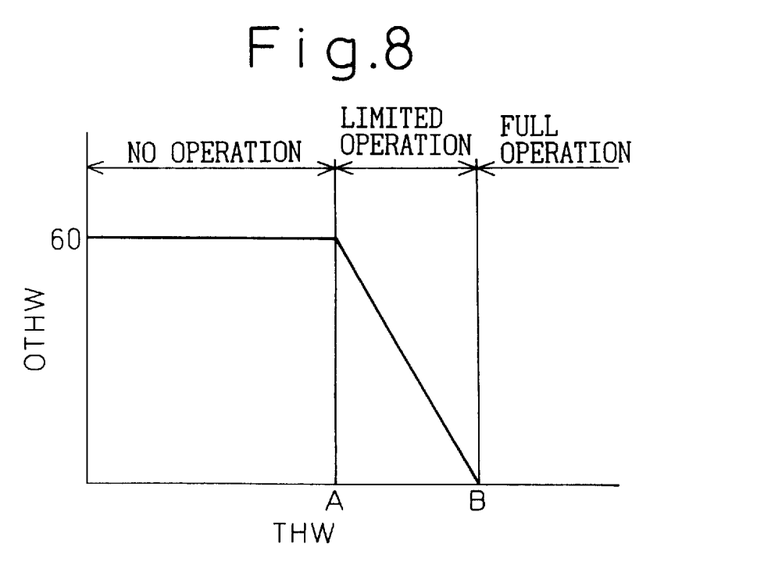
FIG. 8 is a map showing a relationship between a water temperature THW and a correction value OTHW applied to the basic valve timing displacement VTD.

Step 603 reads a water temperature THW from the water temperature sensor 44. Step 604 compares the water temperature THW with a reference temperature of, for example, 80 degrees and determines whether or not the engine is cold, i.e., whether or not the engine is warming up. If THW<80, the engine is cold, and step 605 is carried out. If THW≧80, the warming-up is complete, and step 606 is carried out. Step 605 refers to a water temperature map of FIG. 8 stored in the ROM 73 and calculates a water temperature correction value OTHW, which is used to correct the target displacement VTD.

Figure 7:
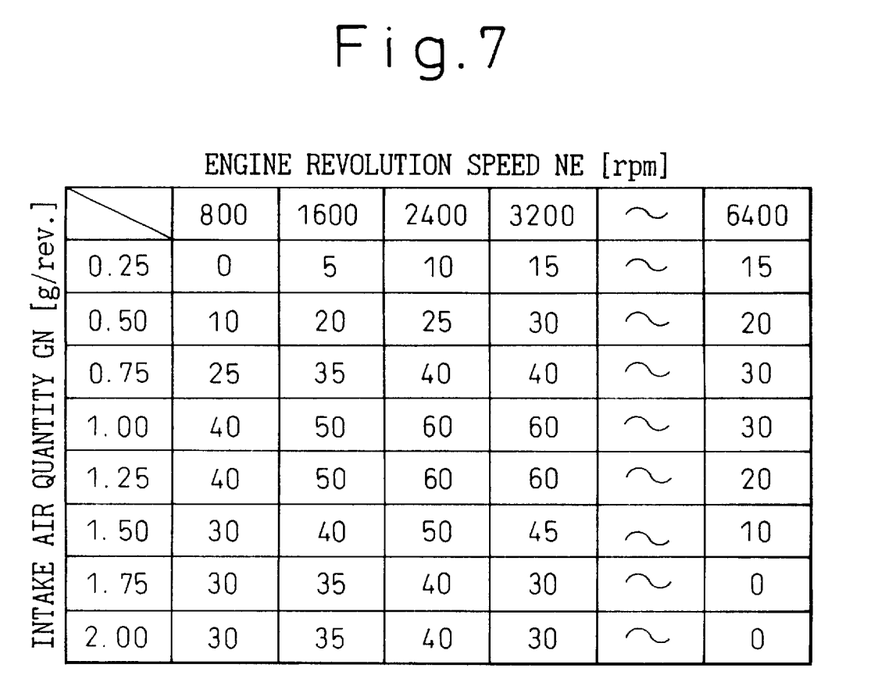
FIG. 7 shows a two-dimensional map used to find a basic valve timing displacement VTD according to an engine revolution speed NE and a load GN.

Correcting the target displacement VTD based on the water temperature THW will be explained in detail. To easily start the engine, the variable valve timing control is stopped if the water temperature THW is low. More precisely, the correction value OTHW corresponding to the water temperature THW is used to decrease the target displacement VTD obtained from the map of FIG. 7 as follows:

$$VTD \leftarrow VTD - OTHW$$

According to the corrected displacement VTD, the variable valve timing control is carried out. The relationship between the water temperature THW and the variable valve timing control (VVT) is as follows:

if THW≦A then stop VVT if A<THW<B then restrictively carry out VVT if B≦THW then fully carry out VVT where A and B are reference temperatures in centigrade.

Step 606 checks the rich spike execution flag RSFLG to see if the rich spike control is in execution. If RSFLG=0, the rich spike control is not in execution, and step 607 is carried out. If RSFLG=1, the rich spike control is being executed, and step 608 is carried out. Step 607 reads an air-fuel ratio from the $O_2$ sensor 45. Step 608 sets a preceding target valve timing displacement VTDold as a present target valve timing displacement VTD.

Step 609 corrects the target displacement VTD according to the air-fuel ratio read in step 607. This correction reduces the valve overlap period if the air-fuel ratio is lean, to stably burn a mixture of fuel and air without a misfire, and increases the valve overlap period if the air-fuel ratio is rich, e.g., is stoichiometric, to reduce fuel consumption and NOx. Step 610 sets the present VTD to a preceding VTDold. In this way, the variable valve timing mechanism 92 of the present invention carries out feedback control according to the corrected valve timing displacement VTD.

As explained above, the present invention occludes NOx in an NOx occlusion and reduction three-way catalyst provided for an engine if the air-fuel ratio of the engine is lean. To discharge and reduce the occluded NOx, the present invention lowers an oxygen concentration in the exhaust gas by regularly carrying out rich spike control for a short time without changing valve timing, i.e., a valve overlap period. Then, a variable valve timing mechanism has no problem of being forced to follow the rich spike operation. The present invention thus maintains the cleanness of exhaust gas and the driveability of the engine and improves the durability of the variable valve timing mechanism.

It will be understood by those skilled in the art that the foregoing descriptions are preferred embodiments of the disclosed apparatus and that various changes and modifications may be made in the invention without departing from the spirit and scope thereof.

What is claimed is:

1. An apparatus for purifying exhaust gas emitted from an internal combustion engine that involves a lean operating condition and a rich operating condition, comprising:

detecting means for detecting an air-fuel ratio of the engine in the exhaust gas;

valve timing means for changing the open and close timing of at least one of the intake and the exhaust valves of the engine according to the detected air-fuel ratio;

catalytic means arranged in an exhaust system of the engine, for occluding NOx under the lean operating condition and discharging and reducing the occluded NOx under the rich operating condition;

rich spike control means for carrying out rich spike control to change the air-fuel ratio of the engine from lean to rich, to thereby discharge and reduce the occluded NOx; and prohibition means for prohibiting the valve timing means from changing the open and close timing of the valves if the rich spike control means is carrying out the rich spike control.

2. A method of purifying exhaust gas emitted from an internal combustion engine that involves a lean operating condition and a rich operating condition, comprising the steps of:

changing the open and close timing of at least one of intake and exhaust valves of the engine according to an air-fuel ratio of the engine; and carrying out rich spike control to momentarily make the air-fuel ratio of the engine rich to reduce an oxygen concentration in exhaust gas so that catalytic means arranged in an exhaust system of the engine may discharge and reduce NOx before the NOx having been occluded by the catalytic means under the lean operating condition reaches the NOx occluding capacity of the catalytic means, and prohibiting any change in the open and close timing of the valves while the rich spike control is being carried out.

* * * * *